(12) United States Patent
Geuens et al.

(10) Patent No.: US 12,002,120 B2
(45) Date of Patent: *Jun. 4, 2024

(54) METHOD FOR DETERMINING AND MONITORING GAS CONSUMPTION IN A GAS NETWORK UNDER PRESSURE OR UNDER VACUUM AND GAS NETWORK

(71) Applicant: ATLAS COPCO AIRPOWER, NAAMLOZE VENNOOTSCHAP, Wilrijk (BE)

(72) Inventors: Philippe Geuens, Wilrijk (BE); Ebrahim Louarroudi, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 328 days.

This patent is subject to a terminal disclaimer.

(21) Appl. No.: 17/418,170

(22) PCT Filed: Nov. 28, 2019

(86) PCT No.: PCT/IB2019/060291
§ 371 (c)(1),
(2) Date: Jun. 24, 2021

(87) PCT Pub. No.: WO2020/136476
PCT Pub. Date: Jul. 2, 2020

(65) Prior Publication Data
US 2022/0108408 A1  Apr. 7, 2022

Related U.S. Application Data

(60) Provisional application No. 62/785,251, filed on Dec. 27, 2018.

(30) Foreign Application Priority Data

Nov. 26, 2019 (BE) .................................. 2019/5841

(51) Int. Cl.
*G01M 3/28* (2006.01)
*G06Q 50/06* (2024.01)

(52) U.S. Cl.
CPC .......... *G06Q 50/06* (2013.01); *G01M 3/2807* (2013.01)

(58) Field of Classification Search
CPC ..... G06Q 50/06; G06Q 10/20; G01M 3/2807; G01M 3/26
See application file for complete search history.

(56) References Cited

U.S. PATENT DOCUMENTS 5,648,605 A † 7/1997 Takahashi
2002/0157448 A1* 10/2002 Hirai ....................... G01F 25/13
73/1.16

(Continued)

FOREIGN PATENT DOCUMENTS

GB        2444080 A    5/2008

OTHER PUBLICATIONS

International Search Report and Written Opinion from PCT Application No. PCT/IB2019/060291, Feb. 12, 2020.

(Continued)

*Primary Examiner* — Andre J Allen
(74) *Attorney, Agent, or Firm* — Workman Nydegger

(57) ABSTRACT

A method is provided for determining and monitoring gas consumption in a gas network under pressure or under vacuum. The gas network may include a sensor(s) capable of recording the state or status of a source(s), consumers, consumer areas or applications. The method includes: a start-up phase, during which the aforementioned sensors are calibrated before use; an optional leak quantification phase, in which unrecorded consumers or leaks are quantified on the basis of measurements from the aforementioned sensors; an operational phase, in which the flow and/or gas volume (Continued)

consumed by each consumer, consumer areas, application or possibly the leak/non-registered consumer is calculated or determined using a cumulative algorithm and a predefined, adjustable time horizon; an output phase, in which the calculated or determined flow and/or gas volume consumed by each consumer, consumer area, application or possibly the leak/non-registered consumer is displayed.

10 Claims, 2 Drawing Sheets

(56) References Cited

U.S. PATENT DOCUMENTS

| | | |
|---|---|---|
| 2003/0187595 A1 † | 10/2003 | Koshinaka |
| 2007/0234784 A1 | 10/2007 | Kates |
| 2010/0082293 A1 | 4/2010 | Mitchell et al. |
| 2015/0346007 A1 | 12/2015 | James et al. |
| 2017/0108361 A1 | 4/2017 | Dennison |
| 2022/0057048 A1 * | 2/2022 | Geuens ............... G01M 3/28 |

OTHER PUBLICATIONS

Search Report and Written Opinion from corresponding BE Application No. BE201905841, Feb. 3, 2020.

* cited by examiner
† cited by third party

METHOD FOR DETERMINING AND MONITORING GAS CONSUMPTION IN A GAS NETWORK UNDER PRESSURE OR UNDER VACUUM AND GAS NETWORK

BACKGROUND

The current invention relates to a method for determining the air consumption in a gas network under pressure or vacuum.

More specifically, the invention is intended to reliably determine the gas consumption of the consumers of a gas network.

"Gas" herein means for example air, but not necessarily. But also nitrogen or natural gas are possible.

This gas network can be under pressure, where the consumers can be pneumatic tools, or under vacuum, for example, where the consumers are applications that require a vacuum. A consumer can be an individual consumer as well as a so-called consumer area or a group of individual consumers.

It is useful to know the consumption of the different consumers in a reliable, fast and correct way, so that the supply of gas can be adjusted to the consumption or so that irregularities can be detected quickly.

Flow and cumulative flow sensors are already known, which can measure the flow and gas consumption of a consumer.

However, it has been found that these sensors are not always reliable, i.e. even in stationary conditions, the flow rate provided by the source or sources is not always equal to the sum of the flow rate consumed by the different consumers.

This can be due to several reasons, such as incorrect calibration of the flow sensors or significant leaks/non-registered consumers in the network.

Some of these causes, such as incorrect calibration, may result in the sensor's measurement of the consumer flow not being correct. As a result, this has a negative impact on the reliability of the reading of the cumulative gas consumption over a certain time horizon (hour, day, week, . . . )

Other causes, such as the occurrence of leaks/unrecorded consumers, do not necessarily affect the correctness of the flow measurement of the consumer. The occurrence of leaks/non-registered consumers ensures that even in stationary conditions the supplied flow rate no longer corresponds to the consumed flow rate.

However, it is not possible to know the cause of the deviation, so that it is not possible to determine whether the flow measurements are correct.

In US2003/187595A1, US2010/082293A1, GB2444080A, US2007/234784A1, and US2015/346007A1 a method for determining and monitoring gas consumption in a gas network is disclosed.

SUMMARY

This invention aims at solving at least one of the aforementioned and other disadvantages by providing a reliable method for determining gas consumption in a gas network.

This invention has a method for determining and monitoring gas consumption in a gas network under pressure or vacuum; the gas network comprising:
- one or more sources of compressed gas or vacuum;
- one or more consumers, consumer areas of compressed gas or vacuum applications;
- pipelines or network of pipelines to transport the compressed gas or vacuum from the sources to the consumers, consumer areas or applications;
- a plurality of sensors, which determine one or more physical parameters of the gas at different times and locations in the gas network, where these sensors comprise at least a number of flow sensors, which measure the flow of the gas taken by the consumers, consumer areas or applications;

wherein the gas network may be provided with additional sensors capable of recording the state or status of the sources, consumers, consumer areas or applications and that the method comprises the following steps:
- a start-up phase, during which the aforementioned sensors are calibrated before use; an optional leak quantification phase, in which leaks/unrecorded consumers are quantified on the basis of measurements from the aforementioned sensors;
- an operational phase, in which the flow and/or volume of gas consumed by each consumer, consumer area, or possibly by the leaks/non-recorded consumers, is calculated or determined using a cumulative algorithm and a predefined, adjustable time horizon T;
- an output phase, in which the calculated or determined flow and/or gas volume consumed by each consumer, consumer area, application, or possibly the leak/non-recorded consumer is displayed, characterized in that the sensors are calibrated during operation or by means of an in-situ self-calibration.

The aforementioned state sensors can detect, whether the source, consumer or consumer area, for example, is on or off.

The aforementioned adjustable time horizon T is for example an hour, day or week.

An advantage is that such a method makes it possible to determine the actual consumption of consumers, or possible leaks or unregistered consumers in the gas network. In practice, unregistered consumers can occur unconsciously in the event of an expansion of an existing gas network.

It is important to note that these leaks can occur in the network itself and not only at the sources or consumers, for example.

The sensors are also calibrated so that the measurements of the sensors, in particular the flow sensors, are accurate and comply with the "mass in-mass out" principle.

In the case of volumetric flow measurement, the sensors shall include at least one pressure sensor and at least one temperature sensor in the vicinity of the flow sensor. In this case, taking into account the compressibility of the gas, the mass flow rate can be derived from the aforementioned pressure sensors, temperature sensors and the volumetric flow rate.

Preferably, the method comprises the step of generating a message when the consumption of a particular consumer and possibly the leak has reached a set, maximum value. On the basis of such a notification or alarm, appropriate or necessary actions can be taken.

This means that these sensors in the gas network, i.e. after they have been installed, are calibrated. "In operation" or "in-situ" means calibration without removing sensors from the gas network.

In this way, you can be sure that the placement of the sensors will not affect their measurements, because only after the placement of the sensors will you perform the calibration.

The invention also concerns a gas network under pressure or under vacuum; the gas network is at least provided with:

one or more sources of compressed gas or vacuum;
one or more consumers, consumer areas of compressed gas or vacuum applications;
pipelines or a network of pipelines to transport the gas or vacuum from the sources to the consumers, consumer areas or applications;
a plurality of sensors which determine one or more physical parameters of the compressed gas at different times and locations in the gas network, where these sensors comprise at least a number of flow sensors, which measure the flow of the gas taken by the consumers, consumer areas or applications;

with the characteristic that the gas network is further provided with:
possibly one or a plurality of sensors that show the state of the sources, consumers, consumer areas or applications;
a data acquisition control unit for the collection of data from the sensors;
a computing unit for carrying out the method in accordance with the invention.

The advantages of such a gas network are similar to those of a method in accordance with the invention.

BRIEF DESCRIPTION OF THE DRAWINGS

To better demonstrate the characteristics of the invention, a number of preferred variants of a method and gas network in accordance with the invention have been described below, by way of example without any restrictive character, with reference to the accompanying drawings, in which.

DETAILED DESCRIPTION OF VARIOUS EMBODIMENTS

Figure 1:
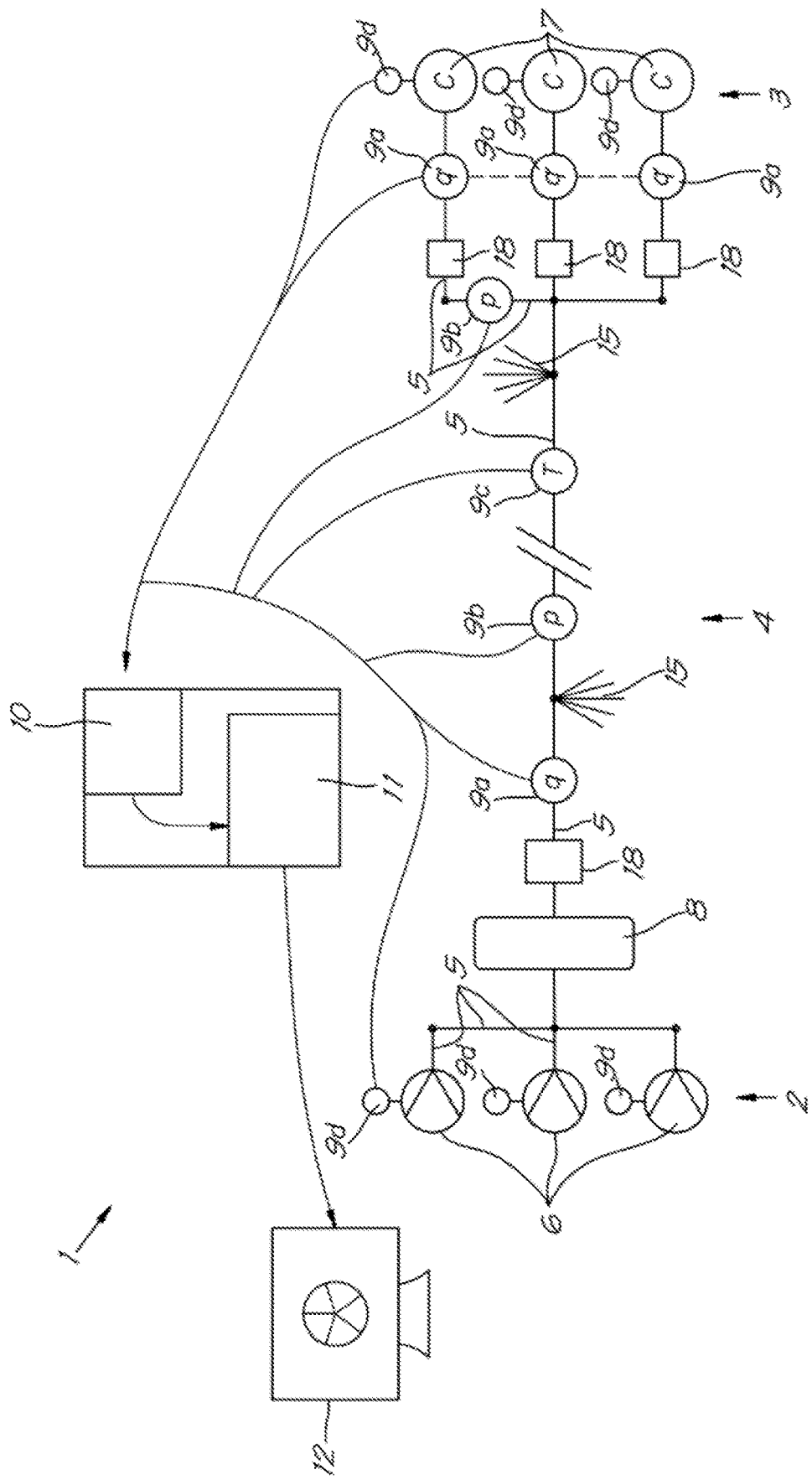
FIG. 1 schematically shows an arrangement in accordance with the invention.

The gas network 1 in FIG. 1 comprises mainly a source side 2, a consumer side 3 and a network 4 of pipelines 5 between the two.

The gas network 1 in this case is a gas network 1 under pressure. The gas may be air, oxygen or nitrogen or any other non-toxic and/or hazardous gas or mixture of gases.

The source side 2 comprises a number of compressors 6, in this case three, which generate compressed air. The consumer side 3 contains a number of consumers 7 of compressed air and in this case also three.

It is not excluded that there may also be compressors 6 downstream of the gas network 1. This is referred to as "boost compressors".

The compressed air is routed through the network 4 of pipelines 5 from the compressors 6 to the consumers 7.

This network 4 is in most cases a very complex network of pipelines 5.

FIG. 1 shows this network 4 in a very schematic and simplified way. In most real situations, the network 4 of pipelines 5 consists of a large number of pipelines 5 that connect the consumers 7 in series and in parallel with each other and with the compressors 6. It is not excluded that a part of the network 4 adopts or comprises a ring structure.

This is because the gas network 1 is often extended over time with additional consumers 7 or compressors 6, wherein new pipelines 5 have to be laid between the existing pipelines 5, which leads to a tangle of pipelines 5.

The gas network 1 may also be provided with a pressure vessel 8, with all compressors 6 in front of this pressure vessel 8. In this case, it is preferable to also measure the pressure in the pressure vessel in order to correct the "mass in-mass out" principle for large, concentrated volumes.

It is not excluded that there may be one or more pressure vessels 8 downstream of the gas network 1.

In addition, components 18, such as filters, separators, atomizers and/or regulators, can also be provided in the gas network 1. These components 18 can be found in different combinations and can be located near the buffer vessel 8 as well as close to the individual consumers 7 or the consumer areas.

Network 4 also includes a number of sensors 9a, 9b, 9c, which are located at different locations in network 4.

In this case, four flow sensors 9a are installed, one just after the aforementioned pressure vessel 8, which will measure the total flow q supplied by all compressors 6, and three just before the aforementioned consumers 7, which will measure the consumed flow q' of the consumers 7. It is also possible that the individual flows of the compressors 6 and the pressure in the buffer vessel 8 are measured by the devices themselves.

In addition, the figure shows two pressure sensors 9b and one temperature sensor 9c, which measure the pressure, respectively the temperature at different locations in the network 4.

It is clear that the number of flow sensors 9a, pressure sensors 9b and temperature sensors 9c is not fixed for the invention and there could also be more or less sensors 9a, 9b, 9c of each type present.

In addition to flow sensors 9a, pressure sensors 9b and temperature sensors 9c, or alternatively or additionally, sensors 9a, 9b, 9c may be used to determine one or more of the following physical parameters of the gas: differential pressure, gas velocity or humidity.

Differential pressure sensors should preferably be placed over the aforementioned components 18. Humidity and temperature sensors should preferably be mounted on the inlet/outlet of the compressors 6 and the consumers 7. In the example shown, these additional sensors 9a, 9b, 9c are not all comprised in the gas network 1, but it goes without saying that this is also possible. Especially in more extensive and complex gas networks 1 such sensors can be used.

In addition to the aforementioned sensors 9a, 9b, 9c, which measure the physical parameters of the gas, there are also a number of sensors 9d, or 'state sensors 9d', which are located in the vicinity of compressors 6, consumers 7 or consumer areas. Preferably, these sensors 9d are part of the consumers 7 itself, which is referred to as smart consumers or smart connected pneumatic devices.

In accordance with the invention, the gas network 1 is further provided with a data acquisition control unit 10 to collect data from the aforementioned sensors 9a, 9b, 9c, 9d.

In other words, sensors 9a, 9b, 9c, 9d determine or measure the physical parameters of the gas and the state of the compressors 6, consumers 7 or consumer areas, and send this data to the data acquisition control unit 10.

In accordance with the invention, the gas network 1 is further provided with a computing unit 11 for processing the data from sensors 9a, 9b, 9c, 9d, wherein the computing unit 11 will be able to carry out the method in accordance with the invention for determining and monitoring the gas consumption in a gas network, as explained below.

The aforementioned computing unit 11 can be a physical module which is a physical part of the gas network 1. It cannot be excluded that the computing unit 11 is not a physical module, but a so-called cloud-based computing unit 11, which may or may not be connected wirelessly to the gas network 1. This means that the computing unit 11 or the software of the computing unit 11 is located in the 'cloud'.

In this case, the gas network 1 is further provided with a monitor 12 for displaying or signaling the calculated or determined flow rate q' and/or the gas volume V' that is consumed by each consumer 7, consumer area, or possibly the leak.

A message or alarm can then be generated on monitor 12 when the consumption of a particular consumer or possibly the leak has reached a set, maximum value.

The operation of gas network 1 and the method in accordance with the invention is very simple and as follows.

Figure 2:
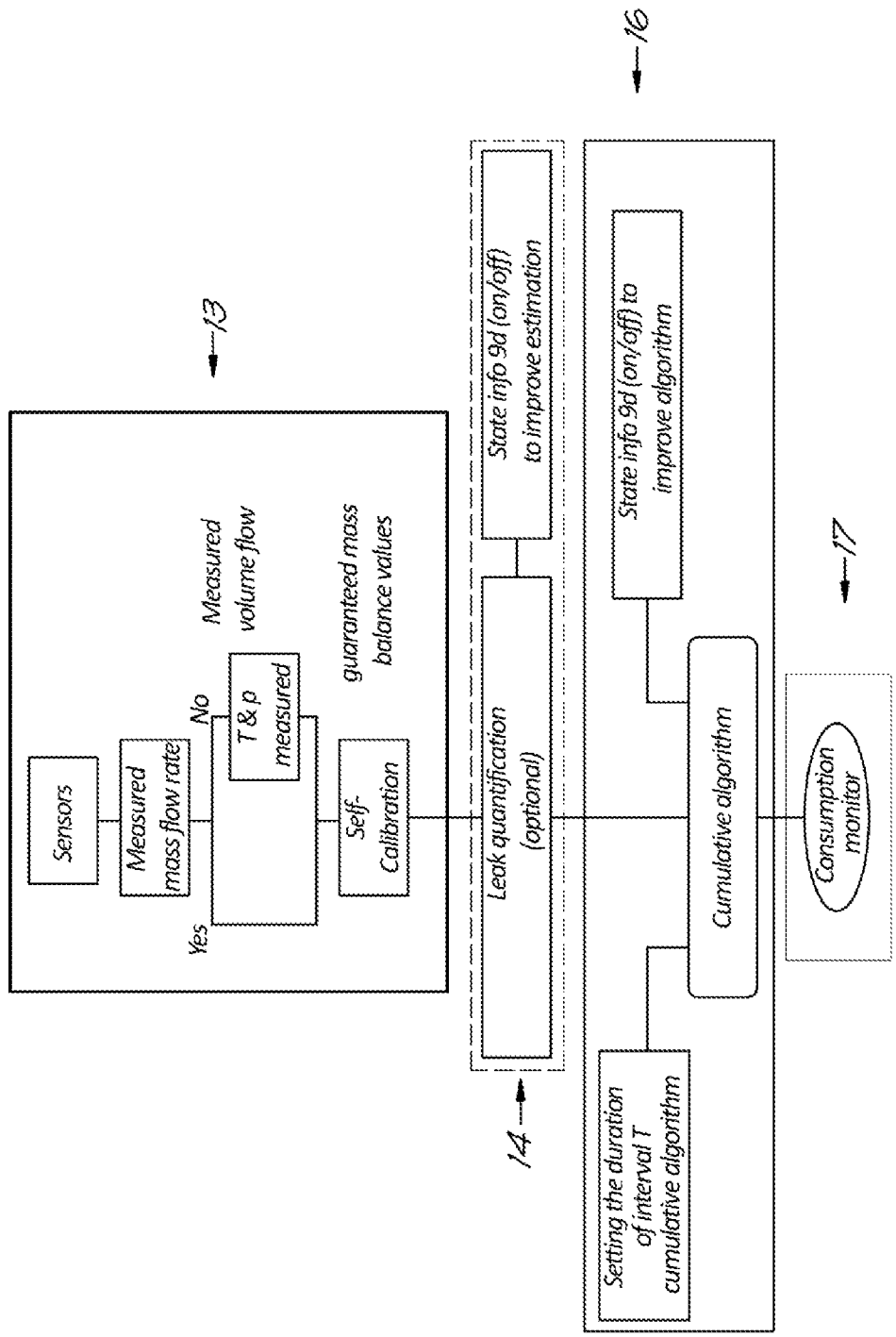
FIG. 2 shows a schematic flowchart of the method in accordance with the invention.

FIG. 2 schematically illustrates the method for determining and monitoring gas consumption in gas network 1 of FIG. 1.

As can be seen in this figure, the method comprises a number of steps.

A start-up phase 13 is started, during which the aforementioned sensors 9a, 9b, 9c, 9d are calibrated before use.

As mentioned above, this should preferably be done by means of an in-situ self-calibration.

Starting from a "leakproof" baseline situation, the calibration means, for example, that for the flow sensors 9a the relationship will be imposed that in stationary conditions the supplied flow rate q is equal to the sum of the consumed flow rates q' by the consumers 7. Preferably, the supplied flow q is also measured or calculated. However, the "mass in-mass out" principle is adapted for large, concentrated volumes, such as for buffer vessels 8 or other pressure vessels, by measuring the pressure in the buffer vessel 8 and taking into account the evolution of the pressure.

The second phase relates to an optional leak quantification 14 phase, in which unrecorded consumers or leaks 15 are quantified on the basis of measurements from the aforementioned sensors 9a, 9b, 9c, 9d.

This makes it possible to compare, if necessary, the leaks 15 that occur in the gas network 1 with the flow rate q' used by the consumers 7.

In the operational phase 16, on the basis of the measurements of the flow sensors 9c, the flow rate q' and/or gas volume V' is determined or calculated that is consumed by each consumer 7. Optionally, the consumption of the leak 15, occurring during the leak quantification phase 14, can also be calculated.

A cumulative algorithm with a specified, adjustable time horizon T, e.g. hour, day, week, . . . is used for this purpose. By taking into account any additional state sensors 9d (e.g. on/off) of the compressors 6, consumers 7 or consumer areas, the cross-sensitivity of the cumulative algorithm can be reduced, making the cumulative algorithm more reliable.

In output phase 17, the flow rate q' and/or gas volume V' consumed by each consumer 7 is displayed on the monitor 12.

In addition, but not necessarily for the invention, during output phase 17, information relating to the aforementioned leaks 15, as determined during the leak quantification phase 14, is also displayed on the monitor 12.

The optional leak quantification phase 14, the operational phase 16 and the output phase 17 are preferably repeated sequentially, with or without a certain time interval t.

This will make it possible to monitor the flow and volume of gas consumed by consumers 7 throughout the entire operational period of gas network 1 and not just once at or shortly after the start of gas network 1, for example.

The aforementioned time interval t can be selected and set depending on the gas network 1.

For the sake of clarity, it is explicitly stated here that the time interval t should not be confused with the aforementioned time horizon T. In practice, time horizon T will usually be much larger than the time interval t.

Although in the example of FIG. 1 it concerns a gas network 1 under pressure, it can also be a gas network 1 under vacuum.

Source side 2 then comprises a number of sources of vacuum, i.e. vacuum pumps or similar.

In this case, the consumer 7 or consumer areas have been replaced by applications that require vacuum.

Furthermore, the method is the same.

This invention is by no means limited to the embodiments by way of example and shown in the figures, but such a method and gas network as claimed in the invention can be carried out in different variants without going beyond the scope of the invention.

The invention claimed is:

1. A method for determining and monitoring gas consumption in a gas network under pressure or under vacuum, the gas network comprising:
   one or more sources of compressed gas or vacuum;
   one or more consumers, consumer areas of compressed gas or vacuum applications;
   pipelines or a network of pipelines to transport the compressed gas or vacuum from the sources to the consumers, consumer areas or applications;
   a plurality of sensors, which determine one or more physical parameters of the gas at different times and locations in the gas network, wherein the plurality of sensors comprises
      at least a number of flow sensors which measure the flow of the gas taken by the consumers, consumer areas or applications,
      or
      at least a number of flow sensors which measure the flow of the gas taken by the consumers, consumer areas or applications and one or a plurality of sensors configured to record a state or status of one or a plurality of sources, consumers, consumer areas, and/or applications;
   wherein the method comprises the following steps:
   a start-up phase, during which the plurality of sensors are calibrated before use;
   an optional leak quantification phase, in which non-registered consumers or one or more leaks are quantified on the basis of measurements from the aforementioned sensors;
   an operational phase, in which the flow and/or gas volume consumed by each consumer, consumer areas, application, the non-registered consumer, and/or one or more leaks is calculated or determined using a cumulative algorithm and a predefined, adjustable time horizon; and
   an output phase, in which the calculated or determined flow and/or gas volume consumed by each consumer, consumer area, application, the non-registered, and/or one or more leaks consumer is displayed,
   wherein the flow sensors are calibrated by means of an in-situ self-calibration,
   wherein during the output phase, information related to the one or more leaks, as determined during the leak quantification phase, is displayed, and
   wherein the leak quantification phase, the operational phase and the output phase are repeated sequentially.

2. The method according to claim 1, wherein one or more of the plurality of sensors the sensors are configured to measure one or more of the following physical parameters of the gas:
flow, pressure, differential pressure, temperature, humidity, and/or gas velocity.

3. A gas network under pressure or under vacuum, the gas network comprising:
one or more sources of compressed gas or vacuum;
one or more consumers, consumer areas of compressed gas or vacuum applications;
pipelines or a network of pipelines to transport the gas or vacuum from the one or more sources to the one or more consumers or consumer areas;
a plurality of sensors, which determine one or more physical parameters of the gas at different times and locations in the gas network, wherein the plurality of sensors comprises
    at least a number of flow sensors, which measure the flow of the gas taken by the consumers, consumer areas or applications,
    or
    at least a number of flow sensors, which measure the flow of the gas taken by the consumers, consumer areas or applications and one or a plurality of sensors which can register the state of one or a plurality of sources, consumers, consumer areas or applications;
a data acquisition control unit for the collection of data from the sensors; and
a computing unit configured to carry out the method according to claim 1.

4. The gas network according to claim 3, wherein the gas network further comprises a monitor that displays the calculated or determined flow and gas volume that is consumed by each consumer.

5. The gas network according to claim 3, wherein the gas network further comprises a monitor that displays a message when the consumption of a given consumer or one or more leaks or non-registered consumers has reached a set, maximum value.

6. The gas network according to claim 3, wherein the plurality of sensors, which can record the status or state of a consumer, are part of the consumers themselves.

7. The gas network according to claim 3, wherein the computing unit is a cloud-based computing unit, which may or may not be connected wireles sly to the gas network.

8. The gas network according to claim 3, wherein the plurality of sensors comprises at least a number of flow sensors, which measure the flow of the gas taken by the consumers, consumer areas or applications and one or a plurality of sensors which can register the state of one or a plurality of sources, consumers, consumer areas or applications.

9. The method according to claim 1, wherein the plurality of sensors comprises at least a number of flow sensors which measure the flow of the gas taken by the consumers, consumer areas or applications and one or a plurality of sensors configured to record a state or status of one or a plurality of sources, consumers, consumer areas, and/or applications.

10. The method according to claim 1, wherein the method comprises
the leak quantification phase, in which unrecorded consumers or leaks are quantified on the basis of measurements from the aforementioned sensors.

* * * * *